Patented Jan. 30, 1951

2,539,429

UNITED STATES PATENT OFFICE 2,539,429

METHOD OF PRODUCING A COMPOSITION OF MATTER IN THE NATURE OF PAINT COLOR BASE

Otto Jensen, Kansas City, Mo., assignor to Seidlitz Paint & Varnish Co., Kansas City, Mo., a corporation of Missouri No Drawing. Application October 27, 1947, Serial No. 782,460

2 Claims. (Cl. 106—262)

This invention relates to a composition of matter in the nature of dispersed paint color base in powder form and particularly to the method of producing the same, and the primary aim is the provision of safe, convenient, efficient and comparatively inexpensive steps usable in the manufacture of a powdered color base for surface coatings.

One of the important aims of the invention is the provision of a series of steps in the manufacture of a color base for paint, at least one of which includes the removal of an element from a number of ingredients without the accompanying hazards and dangerous situations that have heretofore been prevalent in the production of material.

A further aim of the present invention is the provision of an unique process for the manufacture of powdered color bases usable in the production of paints or the like, which process comprises intimately intermixing the components of the color base with a water soluble solvent and later introducing a sufficient amount of water to the mixture to absorb the solvent and leave a precipitate consisting of at least a resin and a pigment capable of being dried and ground to a state of commercially practical character that may be added to paint.

In the manufacture of a color base for paints or the like, a suitable hard, high melting point resin of the synthetic or natural type is desirable as is a pigment which must be combined with the resin before a satisfactory color base may be made. To establish that combination between said resin and the pigment, it is necessary to use a solvent for the resin and then remove that said solvent to the fullest extent possible prior to drying the mass including principally the resin and pigment. The removal of the solvent from the mixture has heretofore been hazardous and dangerous because of the mechanical means employed. My process provides the step of removing the solvent in a safe, efficient and speedy manner all as will be more specifically hereinafter defined.

In following the concepts of the invention, it is desired to employ a hard resin of natural or synthetic type but which is insoluble in water. The resin is dissolved in a water soluble solvent and the necessary amount of natural or synthetic inorganic color pigment is mixed with said solution of resin and solvent. This mixture is ground in a ball or other suitable mill to a predetermined fineness. Organic pigments of chosen type may also be employed and it will be apparent from the following examples that the three ingredients comprising the color base may vary in their specific characteristics so long as the resin is insoluble in water and the solvent is miscible or water soluble. Obviously, the water soluble solvent must be of a nature to dissolve the resin and any one of the six following examples will teach the manner of preparing a batch of coloring material for paint.

The resin I have found satisfactory is a natural resin such as East India gum, metal resonates or a phenol formaldehyde resin.

Examples 1. 1500 lbs. chrome orange
   1500 lbs. molybdate orange
   2400 lbs. resin
   1020 lbs. methyl ethyl ketone
2. 1340 lbs. ferric oxide
   1340 lbs. litharge
   2680 lbs. resin
   1139 lbs. methyl ethyl ketone
3. 150 lbs. black iron oxide
   750 lbs. dark chrome green
   2625 lbs. resin
   375 lbs. litharge
   1275 lbs. methyl ethyl ketone
4. 125 lbs. lamp black
   1250 lbs. black iron oxide
   250 lbs. litharge
   31 lbs. lecitin
   2500 lbs. resin
   1250 lbs. methyl ethyl ketone
5. 220 lbs. para toluidine
   220 lbs. iron oxide
   660 lbs. calcium carbonate
   660 lbs. litharge
   2640 lbs. resin
   1122 lbs. methyl ethyl ketone
6. 1500 lbs. chrome yellow
   833 lbs. ferric oxide
   2666 lbs. resin
   1133 lbs. methyl ethyl ketone In practice a ball or other suitable mill of desired size is charged with the resin, and the desired pigment to be ground to a predetermined fineness. During the grinding step, the pigment is dispersed. The removal of the solvent is necessary because the combined resin and pigment must be dried and ground before it can be introduced into the liquid base of the coating substance.

The water may be added to the mixture in the ball mill if desired and is of sufficient volume to absorb substantially all the solvent. It has been found that at least three parts of water to one part of mixture in the ball mill is necessary and agitation by rotating the ball mill in the same manner as when intermixing the three substances should occur to produce the best results. When the water is added, the solution consisting of the resin, the solvent and the pigment cannot be maintained and the solvent combines with the water by extraction, leaving the resin and pigment in a slurry form which, when filtered out, dried and pulverized, becomes the color base capable of tinting the paint with which it is mixed.

The solvent is necessary in performing the first step in the method because the aforesaid hard resin and pigment will not intermix without first breaking down the resin through a satisfactory solvent therefor. When the water does absorb the solvent, the intimately intermixed pigment and resin becomes the precipitate easily removed from the liquid portion of the mass and capable of being dried and ground with speed of the substantially complete separation of the solvent from the resin and pigment due to the introduction of the water.

The examples given are those which have heretofore been employed by me in the manufacture of a powdered color base and since the tint produced is of no moment, further explanation of the type of pigment materials used need not be made.

Having thus described the invention, what is claimed as new and desired to be secured by Letters Patent is:

1. The method of preparing a color base powder for use in tinting paints which comprises the steps of dissolving a water insoluble resin in a water soluble solvent for said resin, mixing a pigment with said resin solution, grinding said mixture to disperse the pigment throughout said resin solution and to form a finely divided mass of particles comprising dissolved resin having a pigment dispersed therein, adding water to said mass of finely divided particles to form a slurry and extract the water soluble solvent from said resin, filtering said slurry to recover a mass of finely divided particles of solvent-free pigmented resin, drying said last named particles, and pulverizing said particles.

2. The method of preparing a color base powder for use in tinting paints which comprises the steps of dissolving a water insoluble resin in a water soluble solvent for said resin, mixing a pigment with said resin solution, grinding said mixture to disperse the pigment throughout said resin solution and to form a finely divided mass of particles comprising dissolved resin having a pigment dispersed therein, adding water to said mass of finely divided particles in the ratio of three parts of water to one part of said mass of resin solution particles to form a slurry and extract the water soluble solvent from said resin, filtering said slurry to recover a mass of finely divided particles of solvent-free pigmented resin, drying said last named particles and pulverizing said particles.

OTTO JENSEN.

REFERENCES CITED

The following references are of record in the file of this patent:

UNITED STATES PATENTS

| Number | Name | Date |
|---|---|---|
| 1,832,242 | Risse et al. | Nov. 17, 1931 |
| 2,000,003 | Verbyla | Apr. 30, 1935 |
| 2,161,803 | De Stubner | June 13, 1939 |
| 2,245,104 | Greubel | June 10, 1941 |

FOREIGN PATENTS

| Number | Country | Date |
|---|---|---|
| 8,641 | Great Britain | of 1915 |